United States Patent [19]
Schenk

[11] 3,811,157
[45] May 21, 1974

[54] TAMPER-PROOF FASTENER

[75] Inventor: Peter Schenk, West Islip, N.Y.

[73] Assignee: Dzus Fastener Co., Inc., West Islip, N.Y.

[22] Filed: Oct. 26, 1972

[21] Appl. No.: 301,232

[52] U.S. Cl.................. 24/221 R, 16/159, 52/756, 403/349
[51] Int. Cl............................................ A44b 17/00
[58] Field of Search......... 24/221 R, 221 L, 73 RM, 24/73 M; 287/20.92 J, 103 A; 52/756, 757; 403/348, 349, 407; 16/159

[56] References Cited
UNITED STATES PATENTS

| 3,486,205 | 12/1969 | Smith | 24/221 R |
| 3,643,296 | 2/1972 | Kahn | 24/221 R X |
| 3,209,425 | 10/1965 | Barry | 24/221 R |
| 2,981,995 | 5/1961 | Golubics | 24/221 R |

Primary Examiner—Francis K. Zugel
Assistant Examiner—William E. Lyddane
Attorney, Agent, or Firm—Kane, Dalsimer, Kane, Sullivan and Kurucz

[57] ABSTRACT

A tamper-proof fastener adapted to fasten at least two panels together with the panels positioned to form an exterior surface and an interior surface and the panels having aligned openings therein to receive the fastener. The fastener includes a stud and a receptacle both of which are adapted to be partially extended into the openings in the panels. At least one laterally extending prong is on one of the stud and the receptacle and a corresponding cam surface terminating in a locking detent is on the other of the stud and the receptacle so that when the stud and the receptacle are positioned in the openings and rotated with respect to one another in one direction the prong will engage with and follow the cam surface into the locking detent. Thereafter, release of one of the stud and the receptacle will permit only rotation of both the stud and receptacle together. To disassemble, the receptacle is rotated with respect to the stud in a second direction until the prong is moved from the detent over the cam surface to the disengagement position.

6 Claims, 8 Drawing Figures

TAMPER-PROOF FASTENER

BACKGROUND OF THE INVENTION

There are many problems to be concerned with when shipping material in closed containers. This is true whether the container is shipped by air, sea or land. One of the most significant problems is in regard to tampering of the containers during the handling and shipping procedures. In many instances the containers are opened and pilferage occurs. This situation is quite prevalent in air freight shipments where high strength cardboard containers are often used to ship materials while keeping the weight of the shipment at the lowest possible level. An example of the type of material used for such containers is three-ply corrugated cardboard. Naturally, to seal a container of this type it is necessary to fasten together two panels of three-ply material. When tampering does occur, it often occurs at the point where the fastening is accomplished. At that point, the intruder could most easily gain access to the interior of the container since by unlocking or unfastening the holding device, the interior of the container could be reached without the necessity of having to go through the high strength container walls.

The tampering problem has been well known for a considerable period of time and several alternative solutions have been attempted in order to alleviate this problem. For example, two metallic threaded members similar to a bolt and nut arrangement have been utilized so that when the members are extended into the panels from opposing sides thereof and threadedly interengaged, they will lock so that further turning of one of the members will cause both members to turn simultaneously thereby making it extremely difficult to disassemble the fastener.

A second device utilized in the art to relieve the danger of tampering involves a snap-in arrangement whereby one member is extended through an opening from one side of the panels and another member extended through an opening in the other side of the panels. One of the members has an open forward end with two opposing prongs having shoulders thereon and the other member has a stem to fit between the prongs with a forward annular shoulder for engagement with the shoulders on the prongs of the other member. The device is of a flexible material so that when the two members are interengaged the prongs will be flexed outward until a forward enlarged portion of the other member is passed therebetween whereupon the prongs will snap back to their normal position providing the shoulder interengagement between the members and locking the two members together. In other words, the device is a snap-in type of device. This type of device is extremely difficult to disassemble and normally cannot be disassembled without cutting one of the head portions off the assembly thereby limiting the device to one-time use. Naturally by making disassembly virtually impossible, tampering is reduced, however, assembly and disassembly of a container is made extremely difficult and new fasteners have to be used every time since this type of snap-in device is not reusable.

Turning back to consideration of the threaded metal arrangement discussed above, it should be noted that disassembly is even difficult with an embodiment that permits disengagement of the parts. It is time consuming and inefficient to have to disengage two long threaded members which passed through panels such as three-ply corrugated cardboard. Naturally, if the threaded engagement is of the locking type, once again as in regard to the above discussed snap-in type of device the only way the fastener can be disassembled is by cutting off one of the head portions which engages with the inner and outer walls of the container panels. In any event, the shortcomings of both devices are readily apparent.

The primary difficulty with many other types of fasteners well known in the fastener art is that they can be easily opened from the exterior of the container leading to tampering and pilferage. Additionally, many of them have large exposed portions exterior of the container walls particularly on the outside wall which often causes significant damage to adjacent containers and adds to the awkwardness in handling of the container by providing irregular exterior surfaces.

SUMMARY OF THE INVENTION

With the above discussed state of the art in mind, it is among the primary objectives of this invention to provide a tamper-proof fastener for holding adjacent panels of a container together, such as a cardboard shipping container of three-ply corrugated material wherein the fastener is of a light weight, low-cost construction. The fastener is designed so that there is minimum projection on the exterior surface of the container to alleviate possible damaging contact with other containers while minimizing the weight of the container and providing a container which is more efficient and easier to handle.

The fastener is designed so that once in the engaged position it cannot be taken apart with access being only on the exterior of the container. The outside surface is substantially flush with the container wall and is quite smooth and regular in configuration. During assembly, one part of a two-part assembly is rotated with respect to the other to bring the members into the fastened position and thereafter the entire assembly rotates simultaneously when there is only access to the exterior of the container.

Provision is made on the fastener for a predetermined amount of resiliency to permit shifting between the engaged and disengaged position. Additionally, locking ramps and shoulders are provided, the ramps to facilitate entrance of the fastener into the panels and the shoulders to retard the removal of the fastener element from the exterior panel once extended therein. The fastener can be made of a plastic material which is low in cost and which has the inherent resiliency to minimize the necessity for close tolerances. In this manner, variations in the thicknesses of the panels of the container can be easily handled with the wide tolerance range present in the fastener design of the invention. Furthermore, when the fastener is used with a cardboard type of material the resiliency of the cardboard in combination with the resiliency of the fastener contributes to the wide range of tolerance available thereby making the fastener more efficient and easy to construct and use than those known in the prior art.

Thus, a tamper-proof fastener is provided which is adapted to fasten at least two panels together with the panels positioned to form an exterior surface and an interior surface and the panels having aligned openings therein to receive the fastener. A stud having a head portion and a body portion is provided with the head portion being of greater diameter than the body portion and the body portion having an outer diameter less than the openings in the panels so as to be extendable therein with the head portion engaging with the exterior surface of the panels. A receptacle is provided having a receiving portion and a flange portion with the receiving portion having a diameter less than the diameter of at least one of the openings in the panels so as to be extendable therein with the flange portion engaging with the interior surface of the panels. At least one laterally extending prong is on one of the body portion and the receiving portion and a corresponding cam surface terminating in a locking detent is on the other of the body portion and the receiving portion. Therefore, when the stud and the receptacle are positioned in the openings and rotated with respect to one another in one direction, the prong will engage with and follow the cam surface into the locking detent. Thereafter, release of one of the stud and the receptacle will permit only rotation of both the stud and the rectptacle together. For disassembly purposes, the receptacle is rotated in another direction with respect to the stud until the prong is moved from the detent over the cam surface to the disengagement position.

With the above discussed objectives, among others, in mind, reference is had to the attached drawings.

DESCRIPTION OF THE PREFERRED EMBODIMENT

Figure 1:
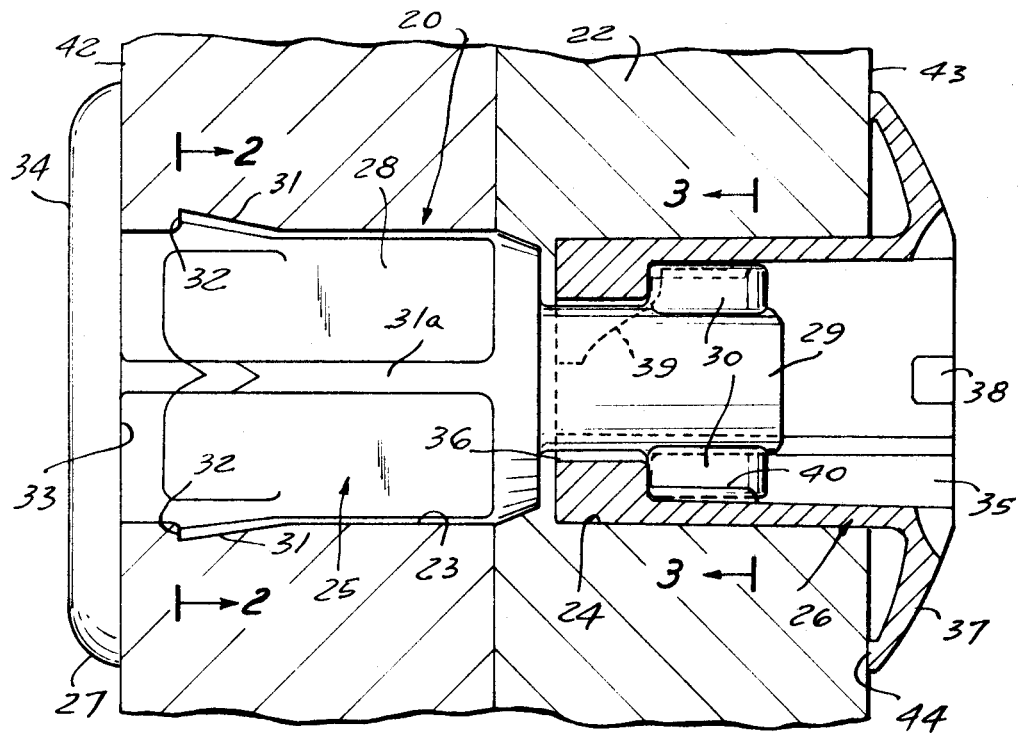
FIG. 1 is a fragmentary partially sectional view of the fastener of the invention shown in engaged position holding two panels together.
Figure 2:
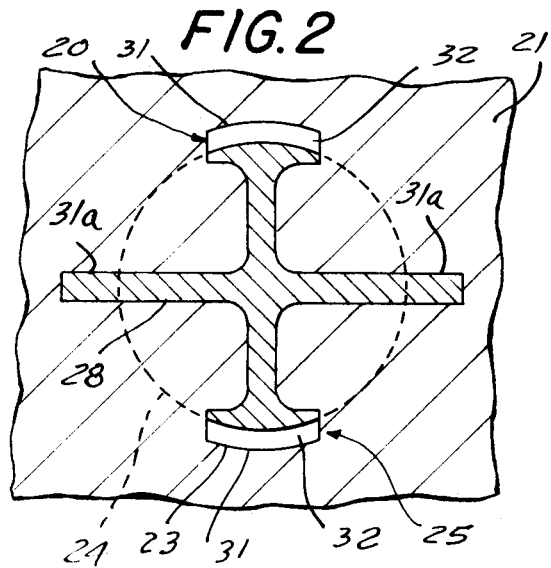
FIG. 2 is a fragmentary sectional end view thereof taken along the plane of line 2—2 of FIG. 1.
Figure 3:
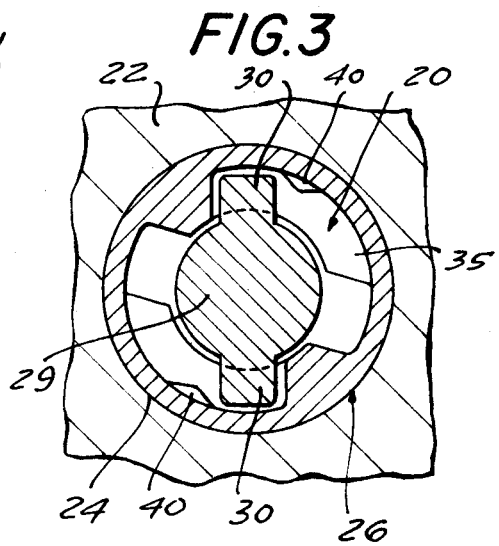
FIG. 3 is a fragmentary end view thereof taken along the plane of line 3—3 of FIG. 1.

FIGS. 1 to 3 of the drawings show the fastener 20 in the locked position holding two panels 21 and 22 together. The material of the panels may vary from structure to structure depending upon the type of container to which fastener 20 is applied. For example, in the air freight environment the container is often constructed of panels of three-ply corrugated cardboard. This type of material combines high strength features with minimum amount of weight which is particularly advantageous in the air freight environment.

Panel 21 has a passageway or opening 23 therethrough and similarly, panel 22 has a passageway or opening 24 therethrough. Panels 21 and 22 are positioned so that openings 23 and 24 are in alignment.

Fastener 20 is a two-piece assembly including a stud 25 and a receptacle 26. These two components of fastener 20 are engageable and rotatable with respect to one another to form fastener 20.

Figure 4:
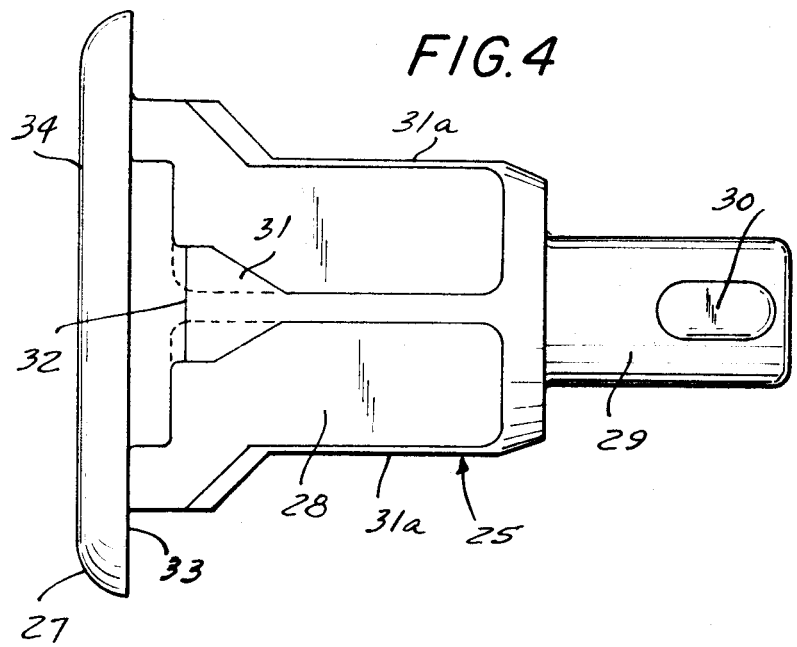
FIG. 4 is a side elevation view of the stud portion of the fastener of the invention.
Figure 5:
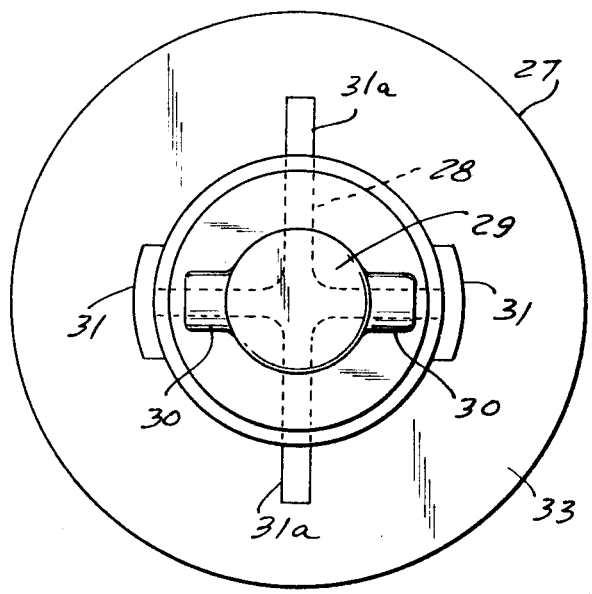
FIG. 5 is an end view thereof.
Figure 7:
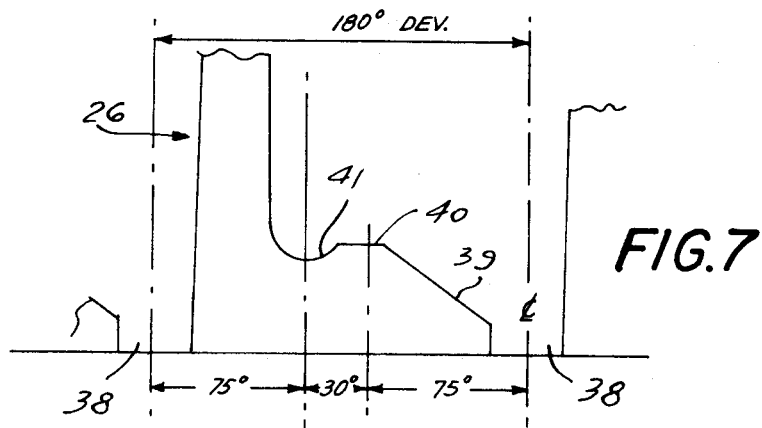
FIG. 7 is a graphical representation of a portion of the inner circumferential surface of the receptacle of the fastener taken along the plane of line 7—7 of FIG. 6 and showing a portion of the cam surfaces therein.
Figure 8:
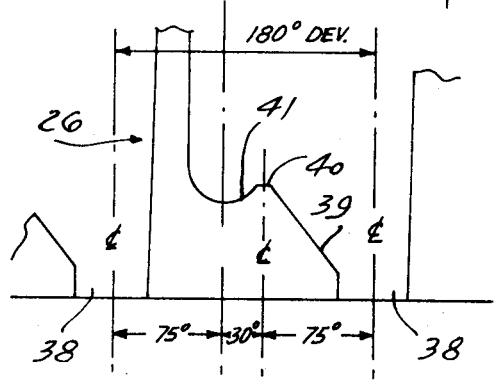
FIG. 8 is a graphical representation of a portion of the inner circumferential surface of the receptacle of the fastener taken along the plane of line 8—8 of FIG. 6 and showing another portion of the cam surfaces therein.
Figure 6:
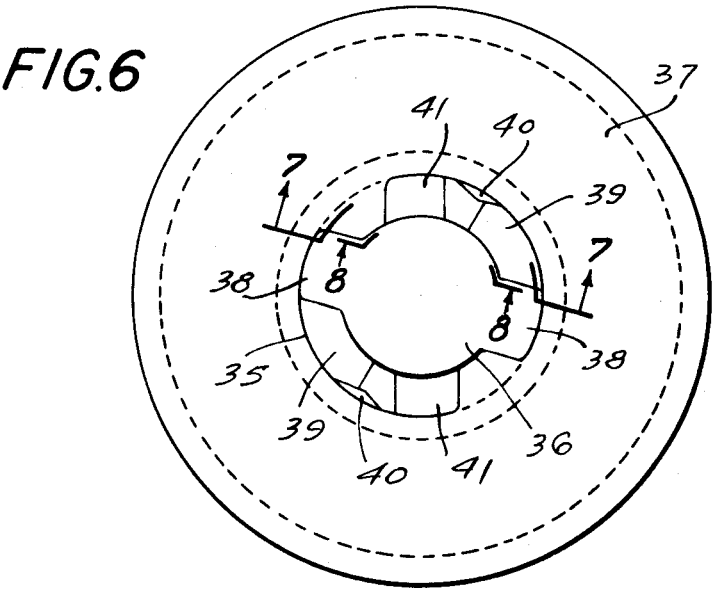
FIG. 6 is an end view of the receptacle portion of the fastener of the assembly.

The details of stud 25 are particularly depicted in FIGS. 4 and 5. Stud 25 includes a head portion 27 and a body portion 28 of lesser diameter extending therefrom. The distal tip 29 of the body portion is further reduced in its exterior diameter and has a pair of opposed prongs 30 extending laterally therefrom. The two prongs 30 are diametrically opposed with respect to each other. The enlarged part of body portion 28 adjacent to head 27 contains a plurality of ramps 31 terminating in shoulders 32 which are substantially parallel to the undersurface 33 of enlarged head 27. Interspaced between the ramps 31 are ribs 31a on body portion 28.

Head 27 is of relatively small thickness and has a smooth continuous outer surface 34.

Receptacle 26 has a hollow interior chamber 35 and an opening 36 to chamber 35 at one end. At the opposite end of receptacle 26 is a laterally extending dish-like circumferential flange 37. At the end of receptacle 26 where flange 37 is located is a central slot 38 adapted to be engaged by a tool in the locking and unlocking procedures as will be discussed in detail below. A pair of diametrically opposed cam surfaces 39 are positioned on the interior surface of receptacle 26 with each cam surface 39 terminating in a bump 40 leading to a locking detent 41.

In operation, when the container is formed, panels 21 and 22 are positioned so that openings 23 and 24 are in alignment. The combination of panels 21 and 22 in engaged relationship form an exterior surface 42 of the container and an interior surface 43 of the container. Receptacle 26 is then inserted into opening 24 in panel 22 until the extreme rim 44 of flange 37 is brought into engagement with interior surface 43. Stud 25 is then inserted into opening 23 until the undersurface 33 of head 27 is brought into engagement with exterior surface 42. In this position, prongs 30 are located within chamber 35 in the unlocked position adjacent to cam surfaces 39 of receptacle 26.

To lock the fastener, head 27 is held in position and a tool is inserted into slot 38 and receptacle 26 is rotated with respect to stud 25. This causes prong 30 to come into engagement with cam surface 39 and follow cam surface 39 until it comes into contact with bump 40 at which time additional force will cause prong 30 to pass over bump 40 and seat in locking detent 41. This is true with respect to both opposing prongs 30. To facilitate the travel of prong 30 with respect to the cam surfaces on receptacle 26, flange 37 is resilient in nature and will deform to permit the prongs to move along the ramp-like cam surfaces and to pass over bumps 40. Additionally, if the cardboard type container is employed the natural resiliency of the cardboard itself will assist in this engagement and locking action between the stud and the receptacle. It should also be kept in mind that it is not necessary that a slot 38 be present for the fastening operation. All that is required is that both the stud and the receptacle be held in a manner which will permit them to rotate with respect to one another. The provision of slot 38 or any well known similar structural feature merely facilitates the rotation of one member with respect to the other of fastener 20. Fastener 20 may be constructed of any low cost, easy to manufacture material such as a rigid relatively high strength plastic.

When fastener 20 is thus in locked position and the container is sealed, only exterior wall 42 is readily accessible to a handler of the container. In this regard, it should be noted that the only exposed surface of the fastener is the continuous smooth outer surface 34 of head 27. As previously stated, head 27 is of minimum thickness thereby providing the least possible projection on the outer surface of the container for possible damage to any adjoining containers or to cause any difficulty in handling of the container. Additionally, should a tamperer be able to get a gripping hold on head 27, rotation of head 27 will merely cause simultaneous rotation of stud 25 and receptacle 26. In this manner, it is impossible to unlock fastener 20 and permit access to the interior of the container. This is extremely advantageous in alleviating the danger of pilferage during shipment as discussed in detail above.

An additional feature on stud 25 are ramps 31 which terminates in shoulders 32. These ramps and shoulders along with ribs 31a act as deterents to actual rotation of stud 25 as well as assiting in retaining stud 25 in opening 23 should an attempt be made to remove stud 25 from opening 23. It can be readily seen that shoulders 32 will engage with the body of panel 21 and assist in retaining the stud 25 in position within end opening 23.

Stud 24 with ramps 31 and 32 is driven into the wall by means of a hammer. Ramps 31 and shoulders 32 lock stud into the material to prevent axial movement when inserted and stud 25 and 24 are not engaged. Ramps 31a are knife edges which cut into the material to prevent rotation so that the fastener can be assembled or disassembled from inside only without assistance from someone on the outside.

When the container has reached its destination and it is desired to disassemble the entire container, the container can be opened in the normal fashion to gain access to the exposed portion of receptacle 26 on the interior surface 43. A tool can be inserted into slot 38 and receptacle 26 rotated with respect to stud 25 to cause prongs 30 to move from locking detents 41 and pass over bumps 40 and follow cam surfaces 39 into the disengagement position. At that time, the receptacle 26 can be disassembled from the stud 25 and panels 21 and 22 can be disassembled for purposes of complete opening of the container. Ramps 31 and ribs 31a assist in retaining stud 25 in position when the receptacle is rotated with respect thereto and, additionally, if desired, head 27 can be held while receptacle 26 is rotated to assure quick and efficient disengagement of the components of fastener 20.

Once again, resilient flange 27 assists in movement of prongs 30 with respect to the cam surfaces on receptacle 26 by permitting prongs 30 to pass over bump 40 with the resilient defamation of flange 37. Naturally, as stated above, in the case of cardboard containers the natural resiliency of the material will also assist in this regard.

The travel distance between the locked and unlocked position for prongs 30 is determined by the length of the cam surface 39 and the bump 40 to reach the locking detent 41. It can be seen from the depicted embodiment that only one-quarter of a revolution is required to shift between the locked and unlocked position. This is of great advantage in quick and efficient assembly and disassembly of the container.

From the above it is apparent that fastener 20 provides a positive locking action to guard against tampering while being composed of an assembly which can be easily and quickly shifted between the locked and unlocked position. Additionally, the resiliency of the fastener permits it to be utilized with a variety of different width panels thereby adding to the versatility and low-cost economic construction of the fastener. Furthermore, the fastener can be assembled and disassembled to hold two panels together without damage to the fastener so that it is reusable on many occasions without loss of operability.

Thus, the above discussed objectives of the invention are effectively attained.

I claim:

1. A tamper-proof fastener adapted to fasten at least two panels together with the panels positioned to form an exterior surface and an interior surface and the panels having aligned openings therein to receive the fastener comprising:

a stud having a head portion and a body portion;

the head portion being of greater diameter than the body portion;

the body portion having an outer diameter less than the openings of the panels so as to be extendable therein with the head portion engaging with the exterior surface of the panels;

a receptacle having a receiving portion and a flange portion;

the receiving portion having a diameter less than the diameter of at least one of the openings in the panels so as to be extendable therein with the flange portion engaging with the interior surface of the panels;

at least one laterally extending prong on one of said body portion and said receiving portion, and a corresponding cam surface terminating in a locking detent on the other of said body portion and said receiving portion so that when said stud and said receptacle are positioned in said openings and rotated with respect to one another in one direction, said prong will engage with and follow the cam surface into the locking detent whereupon release of one of said stud and receptacle will permit only rotation of both stud and receptacle together, and grasping of both of said members thereafter will permit rotation in another direction with respect to one another until the prong is removed from the detent over the cam surface to the disengagement position;

the body portion of the stud containing a plurality of ramps terminating in a plurality of shoulders and spaced about the outer circumferential surface of the body portion of the stud so as to permit insertion of the stud in one direction and to facilitate retention of the stud within the panels when subjected to force in the opposing direction; and a body portion of the stud containing a plurality of radial projections extending therefrom to limit rotation thereof when inserted within the panels thereby alleviating the necessity of grasping of the stud on one side of the panel while rotating the receptacle into locking interengagement therewith from the other side of the panels.

2. The invention in accordance with claim 1 wherein the prong extends laterally from the body portion of the stud, the receiving portion of the receptacle being hollow and open at the end distal from the flange on the receptacle so as to receive the body portion of the stud containing the prong therein, the interior surface of the receiving portion having the cam surface terminating in a locking detent thereon for engagement with the prong on the stud when the stud and receptacle are interconnected and rotated with respect to one another.

3. The invention in accordance with claim 2 wherein there are two diametrically opposed laterally extending prongs on the stud and a corresponding cam surface and locking detent for each prong on the interior surface of the receptacle.

4. The invention in accordance with claim 2 wherein the cam surfaces are of a predetermined length so that only one-quarter of a rotation is needed to shift the stud and receptacle with respect to one another between the locked and unlocked position.

5. The invention in accordance with claim 1 wherein the head of the stud has an undersurface conforming to the exterior surface of the panels, is of a minimum thickness and of predetermined strength and has a substantially smooth exterior exposed surface so as to minimize the portion of the fastener exposed to the exterior of the panels and to render it difficult to engage and rotate the stud portion of the fastener.

6. The invention in accordance with claim 1 wherein the flange on the receptacle is of a flexible material and is curved and circular in configuration with only the circumferential extremity thereof in contact with the interior surface of the panels when the receptacle is positioned therein so that when the fastener is engaged deformation of the flange will facilitate travel of the prong along the cam surface.

* * * * *